March 12, 1935. F. L. CURRAN 1,994,015

AUTOMOBILE JACK

Filed Aug. 11, 1933

Inventor
FRANK L. CURRAN
By Chas. C. Reif.
Attorney

Patented Mar. 12, 1935

1,994,015

UNITED STATES PATENT OFFICE 1,994,015

AUTOMOBILE JACK

Frank L. Curran, St. Paul, Minn., assignor of one-half to John J. Curran, St. Paul, Minn.

Application August 11, 1933, Serial No. 684,675

15 Claims. (Cl. 254—134)

This invention relates to a jack and while said jack may be capable of various applications it particularly is designed for use with an automobile. As is well known, it is often necessary to raise one end of the axle of an automobile in order to change the tire or rim when the tire becomes deflated. Automobiles of late years have been constructed so that the axles are quite close to the ground and it is difficult and often times impossible to get a jack under the axle. This is particularly true if a puncture occurs or the tire is deflated where the road or ground is soft. The difficulty has also been increased owing to the increase in the size of the tires. The large tires when deflated allow the axle to drop so close to the ground that it is often impossible to get a hand-operated jack under the axle in order to raise the same.

It is an object of this invention to provide a simple, efficient, and easily operated jack which may engage the spring of the automobile at the front or rear thereof and thus raise one end of the axle to remove the rim and tire.

It is a further object of the invention to provide a jack having means for clamping the spring or in certain cases the axle of the automobile and then operating the jack to bring the base member thereof into contact with the ground and thus raise the spring and automobile.

It is also an object of the invention to provide a pair of members adapted to engage or clamp the spring or other part of the automobile having pivotally connected thereto an expansible and contractible means carrying a base member adapted to engage the ground whereby the automobile may be raised and lowered.

It is more specifically an object of the invention to provide a jack comprising a member adapted to engage the under side of a spring or other part of an automobile, a second member above said member, means including a screw for relatively moving said members to clamp said spring or other part, a supporting member pivotally connected to said first mentioned member, a base member and a compound toggle connected to said supporting member and base member together with screws for operating said toggle, a device preferably in the form of a crank being provided to engage each of said screws to clamp said spring and subsequently to operate said toggle.

These and other objects and advantages of the invention will be fully set forth in the following description made in connection with the accompanying drawing, in which like reference characters refer to similar parts throughout the several views, and in which:—

Figure 1:
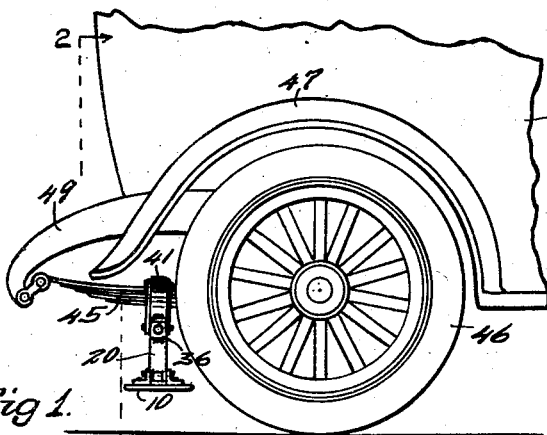
Fig. 1 is a view in side elevation of a portion of an automobile showing the jack applied thereto.

Referring to the drawing, a jack is shown comprising a base member 10. While this member may be variously formed, in the embodiment of the invention illustrated, it is shown as a flat plate having secured thereto at opposite sides thereof angle members 11 connected thereto by rivets 12. Angle members 11 are oppositely disposed and the vertical flanges thereof have extending therethrough and therebetween a pin 13. Pin 13 is held in place by any suitable means such as the split keys 14 extending therethrough outside of the angles 11. Four angle bars 15 are pivoted at their lower ends on pin 13 and extend upwardly in opposite directions in pairs. Each pair of bars 15 are oppositely disposed and are connected intermediate their ends by plates 16, thus forming in effect channel bars. One pair of said bars 15 is pivotally connected to a block 17 having trunnions at either side extending through apertures in said bars. The other pair of bars 15 is connected to a similar block 18. A pair of angle bars 19, similar to bars 15, is also pivotally connected at the sides respectively of block 17 and another pair of bars 20 also similar to bars 15 are connected at their ends to block 18. Said bars are held in place on the trunnions of the blocks 17 and 18 by any suitable means such as the split keys 21. The pairs of bars 19 and 20 extend upwardly in converging relation and have their upper ends pivotally connected to a supporting member 22 having trunnions projecting at either side extending through apertures in the upper ends of bars 19 and 20, said bars being held on said trunnions by any suitable means such as the split keys 23. Bars 19 are connected intermediate their ends by plate 24 so as to form in effect a channel and bars 20 are connected intermediate their ends by a plate 25 so that these oppositely disposed bars also form in effect a channel. Plates 16, 24 and 25 are shown as being riveted to their respective bars. It will be seen that bars 15 and bars 19 and 20 form oppositely disposed toggle levers thus forming a compound toggle. A screw 26 is threaded through blocks 17 and 18, said blocks thus constituting nuts. The threads at the opposite end portions of screw 26 are of opposite pitch so that when said screw is rotated in one direction blocks 17 and 18 will approach and when said screw is rotated in the opposite direction said blocks will be moved apart. Screw 26 has secured to one end one member 27a of a universal joint 27, the other member 27b of which has extending therefrom an end portion 27c of square or angular formation in cross section. A crank 28 is provided having a socket at one end adapted to fit over the portion 27c so that screw 26 can be turned by rotation of crank 28.

Block 22 is bored to receive the cylindrical portion of a screw 30, which portion also extends through the vertically disposed flanges of a pair of oppositely disposed angle brackets 31 riveted to the bottom of a member 32. A collar 33 is disposed at the outer side of one of the brackets 31 and screw 30 has a head 30a engaging the outer side of said collar. A longer collar or sleeve 34 engages the outer side of the other bracket 31 which is engaged by a collar 35 on screw 30. Screw 30 is threaded beyond collar 35 and has a portion 30b at its end which is square or angular in cross section. The threaded portion of screw 30 extends through and carries a nut 36 which has pins 36a projecting from its opposite sides which extend through elongated slots 37a in arms forming the lower ends of a pair of levers 37. Levers 37 are pivoted or fulcrumed on headed pins 38 projecting from opposite sides of member 32. Levers 37 extend upwardly in curved form to be disposed over the top of member 32. Said levers have disposed therebetween and pivoted thereto at their upper ends a member 39, the same being connected to levers 37 by the headed and nutted pivot bolt 40. A member 41 illustrated as a flat plate has one end engaging the top of member 32 adjacent one end thereof and secured thereto by the bolt 42, said member extending upwardly and having its end portion extending horizontally over member 39, the terminal of said member 41 extending slightly downwardly. Member 41 is disposed between the levers 37.

Figure 2:
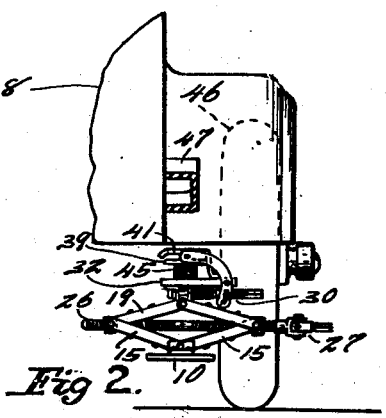
Fig. 2 is a vertical section taken substantially on line 2—2 of Fig. 1 as indicated by the arrows.
Figure 3:
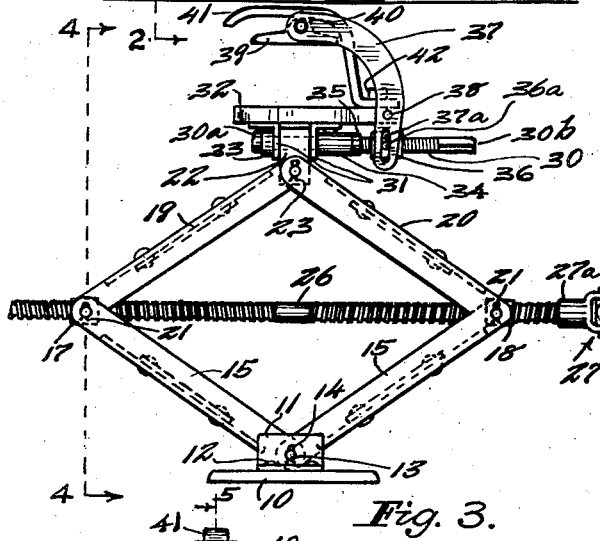
Fig. 3 is a view in side elevation of the jack.
Figures 4, 6:
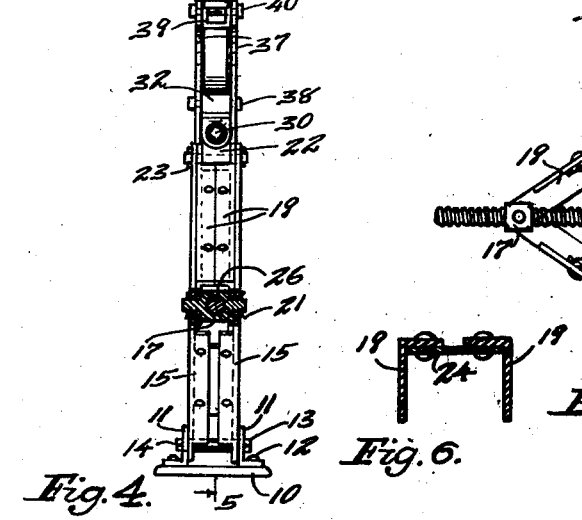
Fig. 4 is a view in vertical section taken on line 4—4 of Fig. 3 as indicated by the arrows.
Fig. 6 is a vertical section taken on line 6—6 of Fig. 5 as indicated by the arrows.
Figure 5:
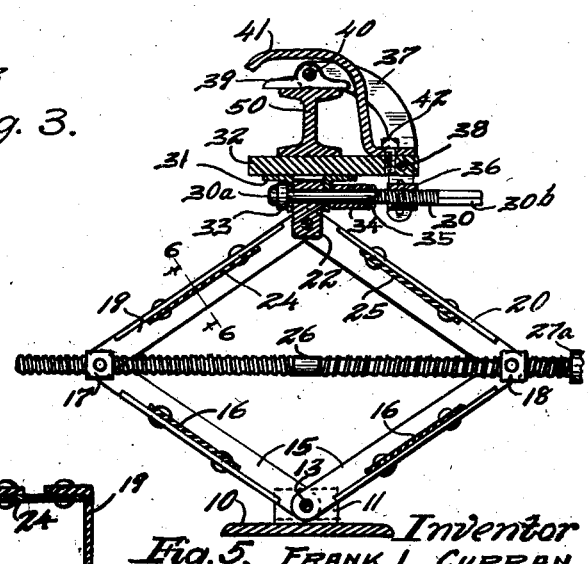
Fig. 5 is a vertical section taken on line 5—5 of Fig. 4 as indicated by the arrows.

In operation when the jack is to be used to lift the car, the crank 28 is placed on the portion 30b of screw 30. Portion 30b is quite long and the jack which is comparatively light in weight can be easily carried and manipulated by holding crank 28 which acts as a handle. The jack is then preferably applied to the spring 45 of the automobile as illustrated in Fig. 1. In Fig. 1 the rear wheel 46, fender 47, a portion of the body 48 and rear portion of the side frame 49 of the automobile are also shown. As illustrated member 32 is placed under the spring and members 39 and 41 extend over the spring. When applied to the rear spring as shown in Fig. 1, member 32 extends substantially at right angles to the spring. When the jack is applied to the front spring of most automobiles it is usually placed at an acute angle to the length of the spring. With the jack so placed and spring 45 between members 32 and 39, the operator now rotates crank 28 rotating screw 30 and moving the lower ends of levers 37 to the right as shown in Figs. 2, 3 and 5. This swings member 39 downwardly and towards member 32 and spring 45 is clamped between members 39 and 32. The jack now occupies the position shown in Fig. 1. The operator now removes crank 28 from screw 30 and places the crank on the portion 27c of the universal joint connected to screw 26. The crank 28 is now turned in a clockwise direction and blocks 17 and 18 are caused to approach each other thus contracting the compound toggle formed by bars 15, 24 and 25 moving base member 10 downwardly. Member 10 eventually engages the ground or supporting surface and further rotation of crank 28 then raises spring 45 and the end of the axle carrying wheel 46. The automobile is thus raised as desired to change the tire without the necessity of getting down in the rear of the automobile and placing a jack beneath the axle. The jack is easily placed on the spring which is quite accessible and a simple and convenient operation can thus be had. As stated the jack is placed on the front spring to raise the front axle in a similar manner except that on most cars it is necessary to have member 32 extending at a more acute angle to the spring. In some cases member 41 can merely be placed over the spring so that the jack is merely hung on the spring without clamping the parts to the spring.

The member 32 and parts carried thereby are oscillatable through a considerable range about the axis of screw 30 so that the toggle portion will hang straight and the plate 10 will properly engage the ground. The provision of the universal joint 27 facilitates the operation of turning screw 26. It will be noted that the jack can be made quite low by entirely contracting the toggle levers.

It is also possible to use the jack on the axle by placing the same in position with member 32 contacting the bottom of the axle as illustrated in Fig. 5 where the axle is shown in cross section and indicated as 50. The axle can be clamped between members 32 and 39 and the jack operated to raise the axle as already described.

From the above description it is seen that applicant has provided a very simple and efficient jack and one which can be quickly applied and easily operated to raise the automobile. The device can be made very strong and rugged and yet the same will not be objectionably heavy. The parts are comparatively few and the device is easily made from standard stock and can be quickly assembled. The same has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:—

1. A device of the class described having in combination, a member adapted to extend across the top of and engage a spring or other part of an automobile, a second member spaced from and beneath said member, means including a swinging member for moving said members together to clamp said spring or other part, a base member, an expansible and contractible means pivotally connected to said base member and second mentioned member and means for expanding and contracting said means.

2. A device of the class described having in combination, a member adapted to engage one side of a spring of an automobile or other part thereof, a lever pivoted to said member, a second member spaced from said first mentioned member and carried by said lever, means for swinging said lever to clamp said spring or other part between said members, a third member connected to said first mentioned member about an axis extending longitudinally of said first mentioned member, a base member, an expansible and contractible means connecting said third member and said base member and means for expanding and contracting said last mentioned means whereby said base member may engage the ground and said spring and automobile be raised and lowered.

3. The structure set forth in claim 2, said expansible and contractible means comprising a compound toggle having levers pivotally connected to one end of said supporting member and at the other end to said base member about parallel axes respectively extending at right angles to said axis.

4. A device of the class described having in combination, a member adapted to engage the under side of a spring or other part of an automobile, a lever pivotally secured to said member, a second member pivotally carried by said lever above said first mentioned member, a supporting member, a pivot member connecting said first mentioned member and said supporting member, said pivot member constituting a screw, a nut on said screw movable thereby connected to one end of said lever whereby said lever may be swung by turning said screw and said first and second member moved together to clamp said spring or other part, a base member, an expansible and contractible means connecting said supporting member and base member and means for expanding and contracting said last mentioned means whereby said base member may engage the ground and said spring or other part may be raised or lowered.

5. The structure set forth in claim 4, said screw having its axis extending longitudinally of said first mentioned member and centrally beneath the same.

6. The structure set forth in claim 4, said expansible and contractible means comprising a compound toggle lever having its ends connected respectively to said supporting member and base member about axes extending at right angles to the axis of said screw.

7. A device of the class described having in combination, a pair of members adapted to clamp a spring of an automobile therebetween, a second member pivotally connected to one of said members, a base member, a pair of oppositely disposed toggle levers forming a compound toggle, the upper ends of said pair being pivotally connected to said second mentioned member, the other ends of said pair being connected to said base member, a pair of members to which the intermediate ends of said toggle levers are connected constituting nuts, a screw extending between and through said nuts having threaded portions of opposite pitch at its respective ends and means for turning said screw to expand and contract said toggle.

8. A device of the class described having in combination, a member adapted to engage the lower side of a spring or other part of an automobile, means carried by said member adapted to extend over the top of said spring to be supported thereby, said members having a space therebetween open at one end of said members so that they can be moved transversely of said spring to be disposed below and above the same respectively a base member, an expansible and contractible means connecting said last mentioned means and base member and means for expanding and contracting said last mentioned means.

9. A device of the class described having in combination, a pair of vertically separated members, said members having a space therebetween open at one end of said members so that the top of one of said members can be moved to extend across the top of an automobile spring and to be moved thereover from one side of said spring, means for moving said members together to clamp said spring therebetween, supporting means connected to one of said members, a base member and means connecting said supporting means and base member for moving the same apart and together whereby said device may be secured to an automobile spring and said base member moved into contact with the ground and said automobile raised.

10. A device of the class described having in combination, a pair of superposed members having a space therebetween open at their end portions so that said members may be moved transversely respectively across the top of and beneath a member such as an automobile spring, means for moving said members together to clamp said spring therebetween, a supporting means for said members pivoted to the lower one thereof, a pair of toggle levers connected at one end to said supporting means, a base plate to which the other ends of said toggle levers are connected and means for expanding and contracting said toggle levers whereby said spring may be raised and lowered.

11. A device of the class described having in combination, a pair of vertically spaced members constructed and arranged to be moved laterally of an automobile spring so as to extend across the top of and below the same respectively, means for moving said members together to clamp said spring including a screw projecting in the direction from which said device was so moved and expansible and contractible means connected to one of said members, a base plate connected to said expansible and contractible means, means for expanding and contracting said last mentioned means including a screw having an end projecting in the same direction as said first mentioned screw and an operating member for engaging said screws to rotate the same to clamp said spring or to operate said expansible and contractible means.

12. A device of the class described having in combination, a base member adapted to engage the ground, a second member spaced vertically from said base member, pairs of oppositely disposed pivoted links connected at their lower ends to said base member and at their upper ends to said second member, a third member pivoted to said second member above said links about an axis extending at right angles to the axis of said pivotal connections of said links, a member disposed above said third member and spaced therefrom, means for moving said last mentioned member toward said third member to clamp a spring or other member of an automobile therebetween and means for swinging said links to move said base member toward and from said second member.

13. A device of the class described having in combination, a member adapted to engage the lower side of a spring or other part of an automobile, means carried by said member above the same, said members having a space therebetween open at one of the ends of said members so that said member and means can be moved transversely of said spring with said member below said spring and said means thereabove, whereby said device can be supported by said spring and means, a member disposed below said first mentioned member and connected thereto about an axis extending longitudinally of said first mentioned member and thus transversely of said spring, a base member, an expansible and contractible means connecting said last mentioned member and base member and means for expanding and contracting said last mentioned means.

14. A device of the class described having in combination, a member adapted to engage the under side of a spring or other part of an automobile, a second member above said member, said members thus having a space therebetween which is open at one of the ends of said members, means including a rotatable screw for moving said members together for clamping said spring, said screw having an end of angular shape in cross section, a base member, an expansible and contractible means connecting said first mentioned member and base member, a second rotatable screw for expanding and contracting said last mentioned means, said screw having an end of angular shape in cross section and a member adapted to fit over the end of either of said screws for rotating the same.

15. A device of the class described having in combination, means constructed and arranged to extend transversely across the top of and beneath a spring of an automobile and to be moved transversely of said spring to said position to engage said spring, a base member, a compound toggle pivotally connected to said base member and connected to said first mentioned means about an axis extending transversely of said spring, means connected respectively to the central pivots of said toggle and constituting nuts, a screw having threads at its ends, opposite in direction, respectively engaging said nuts and means for turning said screw to expand and contract said toggle whereby said base member may engage the ground and said spring be raised and lowered.

FRANK L. CURRAN.